United States Patent [19]

Ma et al.

[11] Patent Number: 5,272,201

[45] Date of Patent: * Dec. 21, 1993

[54] AMINE-CONTAINING BLOCK POLYMERS FOR PIGMENTED INK JET INKS

[75] Inventors: Sheau-Hwa Ma, Chadds Ford; Walter R. Hertler, Kennett Square, both of Pa.; Harry J. Spineli, Wilmington, Del.; Arthur C. Shor, Concordville, Pa.

[73] Assignee: E. I. Du Pont de Nemours and Company, Wilmington, Del.

[*] Notice: The portion of the term of this patent subsequent to Feb. 4, 2009 has been disclaimed.

[21] Appl. No.: 839,533

[22] Filed: Feb. 20, 1992

Related U.S. Application Data

[63] Continuation-in-part of Ser. No. 714,878, Jun. 13, 1991, Pat. No. 5,221,334, which is a continuation-in-part of Ser. No. 508,145, Apr. 11, 1990, Pat. No. 5,085,698.

[51] Int. Cl.$^5$ ............... C08L 53/00; C08L 33/08; C08L 33/10; C08L 33/14
[52] U.S. Cl. ............... 524/505; 524/533; 524/555; 524/556
[58] Field of Search ............... 524/505, 533, 555, 556; 523/160, 161

[56] References Cited

U.S. PATENT DOCUMENTS

| | | | |
|---|---|---|---|
| 4,127,422 | 11/1978 | Guzi, Jr. et al. | 106/308 |
| 4,464,203 | 8/1984 | Belde et al. | 106/308 |
| 5,085,698 | 2/1992 | Ma et al. | 106/20 |

FOREIGN PATENT DOCUMENTS 2-103274 4/1990 Japan.

OTHER PUBLICATIONS

Quirk et al., "Functionalization of Polymethacrylates By Group Transfer Polymerization (GTP)", Polymer Preprints, Apr. 1992, pp. 978-979.

*Primary Examiner*—Paul R. Michl
*Assistant Examiner*—Peter Szekely

[57] ABSTRACT

An aqueous ink jet ink composition having improved dispersion stability comprises an aqueous carrier medium, a pigment having a pH value below 7.0, and an AB block polymer consisting of an A block comprising a hydrophobic polymer having at least one basic amine functional groups, and a B block comprising a hydrophilic polymer selected from the group consisting of nonionic polymers and polymers containing acidic functional groups.

18 Claims, No Drawings

AMINE-CONTAINING BLOCK POLYMERS FOR PIGMENTED INK JET INKS

CROSS-REFERENCE TO RELATED APPLICATIONS

This application is a continuation-in-part of copending U.S. patent application Ser. No. 07/714,878, filed Jun. 13, 1991, now U.S. Pat. No. 5,231,334 which is a continuation-in-part of U.S. patent application Ser. No. 07/508,145, filed Apr. 11, 1990, now U.S. Pat. No. 5,085,698, issued Feb. 4, 1992.

FIELD OF THE INVENTION

This invention relates to aqueous pigmented inks for ink jet printers and, more particularly, to aqueous pigmented inks having improved stability wherein the pigment dispersant is an amine-containing diblock polymer.

BACKGROUND OF THE INVENTION

Ink jet printing is a non-impact method for recording information in response to an electronic signal, such as that generated by a computer. In the printer, the electronic signal produces droplets of ink that are deposited on a substrate such as paper or transparent film. Ink jet printers have found broad commercial acceptance due to their reliability, relatively quiet operation, print quality, and low cost. Thermal or bubble jet drop-on-demand printers have been especially successful and have found broad application as output devices for personal computers in the office and the home.

Both dyes and pigments have been used as ink colorants for ink jet printers. However, dye-based inks have several disadvantages as compared to pigment-based inks. They are usually very water soluble and remain so after drying on the substrate. They are easily redissolved by contact with water and will run when exposed to a water spill. Also, dye images smear on contact with felt pen markers. In addition, they exhibit poor light stability relative to pigments and are known to fade even under conditions of office fluorescent lighting. Thus, dye-based ink jet inks are often unsuitable for use in applications requiring moisture resistance and greater light stability. Pigments, however, provide improved water and smear resistance and improved light stability.

There are three major ink related concerns in the ink jet printing technology. They are (1) print quality, (2) drying rate, and (3) reliability. Print quality is primarily determined by factors such as optical density, edge acuity/feathering, spray and other artifacts, and mainly the resolution of the printer. Drying rate determines the throughput rate and therefore productivity. One of the major deficiency in the current ink devices is their relatively slow printing speed compared to printers using competing technologies. A major obstacle is the ink drying rate because, in a sheet fed printer, the ink must be dry before the succeeding sheet contacts it or the ink will smear.

Drying occurs by both evaporation of the liquid vehicle and ink penetration into the substrate. Evaporation is determined by solvent vapor pressure whereas penetration is determined by interfacial energy between the ink and the substrate and by the porosity of the substrate. For an aqueous ink, the use of penetrants such as organic cosolvents and surfactants is known in the art as a means to increase the rate of penetration of inks.

The third major concern with all ink jet printing devices is obstruction of nozzles during operation and between operations. The obstruction or pluggage is often due to evaporation of the vehicle, causing precipitation or crystallization of the solid components of the ink at the air/liquid interface. In pigmented inks, a further cause of obstruction is the flocculation of dispersed pigment due to a change in solvent composition caused by evaporation. Other reliability issues include storage stability of the ink as seen by physical or chemical changes, compatibility with equipment material, and robustness towards variability in firing conditions.

The use of cosolvents including penetrants, pluggage inhibitors and surfactants to formulate an ink with balanced properties to meet the above mentioned requirements as practiced in the art for dye-based inks, however, tends to cause destabilization of the pigment dispersion. Thus, pigments are a useful alternative to dyes provided the pigment dispersions can be made stable to flocculation and settling. Accordingly, a need exists for dispersants that produce adequate pigment dispersion stability in the presence of other ink components and remain stable throughout the life of the ink jet cartridge.

SUMMARY OF THE INVENTION

The present invention provides a pigmented aqueous ink composition particularly adapted to meet the demanding requirements of a fast drying ink jet ink, the ink composition comprising:
(a) an aqueous carrier medium;
(b) a pigment having a pH below 7.0; and
(c) an AB block polymer consisting of
  (1) an A block comprising a hydrophobic polymer having at least one basic amine functional group; and
  (2) a B block comprising a hydrophilic polymer selected from the group consisting of non-ionic polymers, and polymers containing acidic functional groups.

DETAILED DESCRIPTION OF THE INVENTION

The ink jet ink compositions of this invention are particularly suited for use in ink jet printers in general, and thermal ink jet printers in particular. The inks may be adapted to the requirements of a particular ink jet printer to provide a balance of light stability, smear resistance, viscosity, surface tension, optical density, and pluggage resistance as desired for the particular application.

AQUEOUS CARRIER MEDIUM

The aqueous carrier medium comprises water or a mixture of water and at least one water soluble organic solvent. Deionized water is commonly used. Representative examples of water-soluble organic solvents are disclosed in Assignee's patent application U.S. Ser. No. 07/508,145 filed Apr. 11, 1990, now U.S. Pat. No. 5,085,698 the disclosure of which is incorporated herein by reference. The selection of a suitable mixture of water and water soluble organic solvent depends upon requirements of the specific application, such as desired surface tension and viscosity, the selected pigment, drying time of the ink, and the type of media substrate onto which the ink will be printed.

A mixture of a water soluble organic solvent having at least 2 hydroxyl groups, e.g., diethylene glycol, and deionized water is preferred as the aqueous carrier medium, with water comprising between 30% and 95%, preferably 60% to 95%, by weight, based on the total weight of the aqueous carrier medium. The amount of aqueous carrier medium is in the range of approximately 70 to 99.8%, preferably approximately 94 to 99.8%, based on total weight of the ink when an organic pigment is selected, and approximately 25 to 99.8%, preferably approximately 70 to 99.8% when an inorganic pigment is selected.

PIGMENT

The term "pigment" as used herein means an insoluble colorant. In order to obtain the desired acid-base interactions with the dispersants of this invention, the pigment needs to have acidic groups on the surface of the pigment particle, i.e., the pigment must have a pH < 7.0. Such pigments are well known in the art. For example, all carbon blacks have chemisorbed oxygenated complexes, primarily acidic in nature, e.g., carboxylic, quinonic, lactonic or phenolic groups, on their surfaces to varying degrees depending upon the conditions of manufacture. These acidic groups on the pigment surface provide binding sites for dispersants with basic functions such as amine. The acid-base interaction is considered stronger than the Van der Waal's force or hydrogen bonding, hence a stronger binding of the dispersant to the pigment for greater dispersion stability. These acidic surface constituents are collectively referred to as "Volatile Content" and expressed as weight loss in percent after heating a dried carbon black to 950° C. Some carbon blacks have surfaces which have been purposely oxidized, usually by after treatment with various oxidizing agents, to increase their Volatile Content.

Other pigments with acidic surfaces, where either the pigment itself contains acidic groups or its surface has been modified by agents containing acidic groups such as sulfonic, phosphoric, or carboxylic acid groups, are equally useful in this invention. Examples of pigments which may be used to advantage include azo, anthraquinone, thioindigo, oxazine, quinacridone, lakes and toners of acidic dye stuffs, copper phthalocyanine and its derivatives, and various mixtures and modifications thereof.

The pigment particles need to be sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from flocculating. It is also desirable to use small particles for maximum color strength and gloss. The range of useful particle size is approximately 0.005 micron to 15 micron. Preferably, the pigment particle size should range from 0.005 to 1 micron. The selected pigment may be used in dry or wet form such as presscakes.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments.

AB BLOCK POLYMERS

The AB diblock polymers of this invention consist of an A block comprising a hydrophobic polymer having at least one basic amine group and a B block comprising a hydrophilic polymer selected from the group consisting of non-ionic polymers and polymers having acidic functional groups. It has been found that the ink compositions of this invention show improved binding between the A block and the pigment and thus form more stable dispersions.

The A block may be a homopolymer of the amine-containing monomer or a copolymer of the amine-containing monomer with other monomers. Examples of amine-containing monomers include dimethylaminoethyl methacrylate (DMAEMA), diethylaminoethyl methacrylate, t-butylaminoethyl methacrylate, dimethylaminoethyl acrylate, diethylaminoethyl acrylate, vinyl pyrridine, N-vinyl pyrrolidone, 4-aminostyrene, etc. Monomers which can be used with the amine-containing monomers for the A block include methyl methacrylate (MMA), n-butyl methacrylate (BMA), 2-ethylhexyl methacrylate (EHMA), benzyl methacrylate (BzMA), 2-phenylethyl methacrylate (PEMA), hydroxyethyl methacrylate (HEMA), methacrylonitrile, glycidyl methacrylate, sorbyl methacrylate, methyl acrylate, ethyl acrylate, butyl acrylate, 2-ethylhexyl acrylate, styrene, 4-methylstyrene, vinyl naphthalene and phenyl acrylate.

The A block of the polymer contains at least one basic amine group. Particularly useful as A blocks are polymers or copolymers having amine groups within the A block or at the open end, i.e., at the end of each A block furthest from the B block. Preferably, A blocks are polymers or copolymers having amine groups at the open end and within the block. Although several amine groups may be present in the A block, care must be taken to insure that the number of amine groups is not such as to render the A block hydrophilic.

The amine functions can be advantageously introduced into the A block by polymerizing monomers with amine functions. The preferred method of making the AB block polymers with at least one amine group at the open end of each A block (i.e., the end of the A block remote from the connection between the A block and the B block) is a "living" polymerization technique in which an amine-containing initiator is used to initiate polymerization. Living polymerization techniques are well known in the art and are exemplified by Webster in *J. Amer. Chem. Soc.*, 1983, 105, 5706, anionic polymerization as described by Morton in "*Anionic Polymerization: Principles and Practice*", Academic Press, N.Y., 1983, or ring-opening polymerization as described by Ivin et al. in "*Ring Opening Polymerization*", N.Y., 1984; Vol. 1, p 461. The most preferred method is by group transfer polymerization.

Examples of amine-containing initiators for the above-referenced polymerization techniques include:
(1) for anionic polymerization of methacrylates; 1-(dimethylaminomethylphenyl)-1-phenyl-1-hexyl lithium 1, which can be prepared by the reaction of n-butyl lithium with 1-(dimethylaminomethylphenyl)-1-phenylethylene;

(2) for ring-opening polymerization of lactones; sodium 3-dimethylaminopropionate 2;

(3) for group transfer polymerization; 1-(2-dimethylaminoethoxy)-1-trimethylsiloxy-2-methyl-1-propene 3; 3-dimethylamino-1-methoxy-2-methyl-1-trimethylsiloxy-1-propene 4; 3-diethylamino-1-methoxy-2-methyl-1-trimethylsiloxy-1-propene 4; 1-(2-N-methyl-N-phenylaminoethoxy)-1-trimethylsiloxy-2-methyl-1-propene 5.

Other amine-containing silyl ketene acetal initiators for group transfer polymerization may be readily prepared from aminoesters by the general procedure described by Ainsworth et al. in *J. Organomet. Chem.*, 1972, 46, 59. It may be desirable to use a group transfer polymerization initiator containing a masked amine, such as 3-bis(trimethylsilyl) amino-1-methoxy-2-methyl-1-trimethylsiloxy-1-propene 6 which would provide a means of preparing a block polymer with a primary amine end group after the fluoride-catalyzed removal of the silyl protecting group.

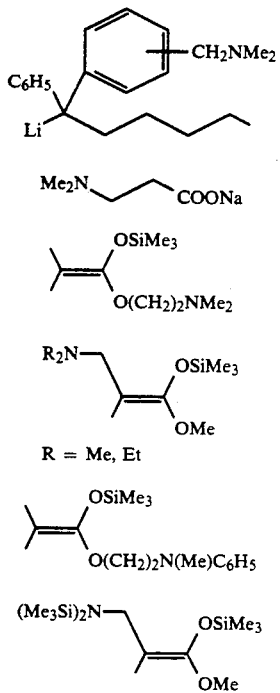

Alternative methods to the use of amine-containing initiators for the preparation of block polymers with amine end groups are chain transfer with amine-containing chain transfer agents, termination with amine-containing termination reagents, and reaction of functional-ended block polymers with amine-containing reagents. For example, the sequential use of an amine-containing 2-arylpropionitrile as a chain transfer agent in group transfer polymerization of methacrylates as described by Hertler et al., U.S. Pat. No. 4,656,233, will introduce a terminal amine group. Since aldehydes have been shown by Sogah et al. in *Macromolecules*, 1986, 19, 1775, to be terminators of group transfer polymerization, termination of a living block polymer prepared by group transfer polymerization with an amine-containing aldehyde would provide an amine-ended block copolymer. Reaction of a hydroxy-ended block polymer prepared by a living polymerization method, such as group transfer polymerization, will react with a potential amine-containing reagent, such as a diisocyanate.

The function of the B block is to facilitate dispersion of the pigment in the aqueous carrier medium. The B block is a hydrophilic, or water-soluble polymer or copolymer. In order not to interfere with the desired acid/base interaction between the A block and the pigment surface, the B block must be either non-ionic or of acidic nature. The B block may also be a copolymer of an acid and a non-ionic hydrophilic monomer such as those described below. It may also be a copolymer of an acid or a non-ionic hydrophilic monomer with other non-amine containing monomers, such as those used in the A block. Representative acid monomers include methacrylic acid (MAA) and acrylic acid. Representative non-ionic hydrophilic monomers include hydroxyethyl methacrylate, methoxypolyethylene glycol methacrylate.

The acid containing polymer may be made directly or may be made from a blocked monomer with the blocking group being removed after polymerization. Examples of blocked monomers that generate acrylic or methacrylic acid after removal of the blocking group include trimethylsilyl methacrylate, trimethylsilyl acrylate, 1-butoxyethyl acrylate, 1-ethoxyethyl acrylate, 2-tetrahydropyranyl acrylate, tert-butyl methacrylate, and 2-tetrahydropyranyl methacrylate. The acid or non-ionic hydrophilic monomers may be used in a range of 10–100%, preferable in a range of 20–100%, of the B block composition. The B block generally will constitute 10–90, preferably 25–65%, of the entire block polymer by weight.

To solubilize the B block into the aqueous medium, it may be necessary to make salts of the acid groups contained in the B block. Salts of the acid monomers can be made with the counter component being selected from organic bases, alkanolamines, alkali metal hydroxides, and mixtures thereof, such as those disclosed in Assignee's patent application U.S. Ser. No. 07/508,145 filed Apr. 11, 1990, the disclosure of which is incorporated herein by reference.

Block polymers that are selected to advantage in practicing the invention have a number average molecular weight below 20,000, preferably below 15,000, and typically in the range of 1,000–5,000.

The block polymer is present in the range of approximately 0.1 to 30% by weight of the total ink composition, preferably in the range of approximately 0.1% to 8% by weight of the total ink composition. If the amount of polymer becomes too high, the ink color density will be unacceptable and it will become difficult to maintain desired ink viscosity. Dispersion stability of the pigment particles is adversely affected if insufficient block polymer is present.

OTHER INGREDIENTS

Consistent with the requirements for the particular application, various types of aqueous additives can be used to modify the properties of the ink composition. Surfactant compounds may be used in addition to the amine-containing AB diblock polymer dispersants. These may be anionic, nonionic, or amphoteric surfactants. A detailed list of non-polymeric as well as some polymeric surfactants are listed at pages 110–129, of 1990 McCutcheon's Functional Materials, North American Edition, Manufacturing Confection Publishing Co., Glen Rock, N.J., the disclosure of which is incorporated herein by reference. It is known in the art that certain surfactants may be incompatible with certain ink compositions and may destabilize the pigment dispersion. The choice of a specific surfactant is also highly dependent on the type of media substrate to be printed. It is expected that one skilled in the art can select the appropriate surfactant for the specific substrate to be used in the particular ink composition. In aqueous inks, the surfactants may be present in the amount of 0.01-5% and preferably 0.2-2%, based on the total weight of the ink.

Cosolvents to improve penetration and pluggage inhibition properties of the ink composition may also be added, and in fact are preferred. Such cosolvents are well known in the prior art. Exemplary cosolvents which can be used to advantage include those used in the examples below.

Biocides may be used in the ink compositions to inhibit growth of microorganisms. Dowicides ® (Dow Chemical, Midland, Mich.), Nuosept ® (Huls America, Inc., Piscataway, N.J.), Omidines ® (Olin Corp., Cheshire, Conn.), Nopcocides ® (Henkel Corp., Ambler, Pa.), Troysans ® (Troy Chemical Corp., Newark, N.J.) and sodium benzoate are examples of such biocides.

Sequestering agents such as EDTA may also be included to eliminate deleterious effects of heavy metal impurities. Other known additives, such as humectants, viscosity modifiers and other acrylic or non-acrylic polymers may also be added to improve various properties of the ink compositions as desired.

INK PROPERTIES AND PREPARATION

The ink compositions of the present invention are prepared in the same manner as other ink jet ink compositions. The pigment dispersion is prepared by premixing the selected pigment(s) and the AB block polymer in water. The dispersion step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium. It is generally desirable to make the pigmented ink jet ink in concentrated form, which is subsequently diluted with a suitable liquid to the appropriate concentration for use in the ink jet printing system. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm at 20° C. Acceptable viscosities are no greater than 20 cP, and preferably in the range of about 1.0 cP to about 10.0 cP at 20° C. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers.

The inks have excellent storage stability for a long period and do not clog in an ink jet apparatus. Fixing the ink on the media substrate, such as, paper, fabric, film, etc., can be carried out rapidly and accurately. The printed ink images have clear color tones, high density, excellent water resistance and lightfastness. Furthermore, the inks are compatible with the ink jet printing apparatus and they are essentially odorless.

EXAMPLES

Polymer Preparation

In a number of the procedures set forth below, the polymers were prepared using an amine-containing initiator, 1-(2-dimethylaminoethoxy)-1-trimethylsiloxy-2-methyl-1-propene. This initiator was prepared by the following procedure.

To a mechanically stirred solution of 83.66 g (94.3 mL, 0.939 mol) of 2-dimethylaminoethanol (distilled) and 95 g (131 mL) of triethylamine (Aldrich gold label) in 1L of dry dichloromethane maintained at 0° to −15° C. was added dropwise 100 g (98.3 mL, 0.939 mol) of isobutyryl chloride. The mixture was stirred 30 min at room temperature and treated with a solution of 100 g of sodium bicarbonate in water. The organic layer was washed with dilute sodium bicarbonate solution, dried with sodium sulfate and distilled to give 46.2 g of 2-dimethylaminoethyl isobutyrate, b.p. 59°-64° C. (8–10 mm). $^1$H-NMR (360 MHz, benzene-d$_6$): 1.06 (d, J=6.6 Hz, 6 H, Me$_2$CH), 2.05 (s, 6 H, CH$_3$N), 2.33 (t, J=6 Hz, 2 H, CH$_2$N), 2.39 (sept, J=6.6 Hz, 1 H, Me$_2$CH), 4.11 (t, J=6 Hz, 2 H, CH$_2$O). Anal Calcd for C$_8$H$_{17}$NO$_2$: C 60.35, H 10.76, N 8.80; found: C 60.82, H 10.95, N 9.01.

To a solution of 31.78 g (44 mL, 0.314 mol) of diisopropylamine (Aldrich gold label) in 300 mL of tetrahydrofuran at −5° to 0° C. was added over a period of about 30 min. 0.314 mol of 1.6N n-butyl lithium in hexane (196 mL). After 30 min at 0° C., the solution was cooled to −78° C. and 50 g (0.314 mol) of 2-dimethylaminoethyl isobutyrate, prepared as above, was added keeping the temperature below −70° C. Then 34.11 g (39.9 mL, 0.314 mol) of chlorotrimethylsilane was added below −70° C. After warming to room temperature, the mixture was concentrated on a rotary evaporator, and the residue was treated with hexane and filtered under argon. The filtrate was concentrated on a rotary evaporator and distilled in a spinning band column to give 45.4 g of 1-(2-dimethylaminoethoxy)-1-trimethylsiloxy-2-methyl-1-propene, b.p. 39°-42.5° C. (0.5 mm). $^1$H-NMR (360 MHz, benzene-d$_6$): 0.22 (s, 9 H, SiMe), 1.67 (s, 3 H, =CCH$_3$), 1.77 (s, 3 H, =CCH$_3$), 2.12 (s, 6 H, NCH$_3$), 2.46 (t, J=6 Hz, 2 H, CH$_2$N), 3.85 (t, J=6 Hz, 2 H, CH$_2$O). Anal Calcd for C$_{11}$H$_{25}$O$_2$SiN: C 57.09, H 10.89, N 6.05, Si 12.14. Found: C 57.27, H 11.11, N 6.17, Si 11.37. IR (neat): 1705 cm$^{-1}$ (C=C), no C=O absorption.

PREPARATION A

Poly ω-2-β-dimethylaminoethyl isobutyrate (butyl methacrylate [46 mol %]-b-methacrylic acid [54 mol %]), amine initiator//BMA//MAA (initiator//9//10)

A solution of 2.08 g (2.36 mL, 8.97 mmol) of 1-(2-dimethylaminoethoxy)-1-trimethyl-siloxy-2-methyl-1-propene, 0.5 mL of tetrabutylammonium biacetate hexahydrate (0.04M in THF), and 0.8 g (1.0 mL, 6 mmol) of bis(dimethylamino)-methylsilane in 90 mL of THF was allowed to stand for 10 min. Then a mixture of 11.1 g (12.4 mL, 78 mmol) of butyl methacrylate (purified by passage over a column of basic alumina under argon), and 0.4 g (0.5 mL, 3 mmol) of bis(dimethylamino)methylsilane was added dropwide from an addition funnel. The temperature of the reaction mixture rose from 27° C. to 48° C. during the course of the addition. When, following the conclusion of the addition, the temperature had fallen about 2° C., the dropwise addition of a mixture of 15.3 g (15.0 mL, 89.9 mol) of 2-tetrahydropyranyl methacrylate (purified by passage over a column of basic alumina under argon) and 0.4 g (0.5 mL, 3 mmol) of bis(dimethylamino)-methylsilane was begun. During the course of the addition the temperature of the reaction mixture rose to 57° C. Analysis of an aliquot of the solution by $^1$H NMR showed that there was no residual monomer present. After addition of 10 mL of methanol, the solution was evaporated under reduced pressure. The residual poly $\omega$-2-$\beta$-dimethylaminoethyl isobutyrate(butyl methacrylate [46 mol %]-b-tetrahydropyranyl methacrylate [54 mol %]) was dissolved in dichloromethane and precipitated into methanol. The polymer was heated in a vacuum oven at 138° C. to decompose the tetrahydropyranyl ester groups, giving 20.8 g of poly $\omega$-2-$\beta$-dimethylaminoethyl isobutyrate(butyl methacrylate [46 mol %]-b-methacrylic acid [54 mol %]).

The block polymer was neutralized by prewetting 8 g of the polymer with 8 g of a mixture of tetrahydrofuran and isopropanol (3:2 by weight) and mixing with potassium hydroxide (0.984N solution) until a 16.9% polymer solution was obtained.

PREPARATION B

Poly $\omega$-2-$\beta$-dimethylaminoethyl isobutyrate(2-dimethylaminoethyl methacrylate [9 mol %]-co-n-butyl methacrylate [32 mol %]-b-methacrylic acid [59 mol %]), amine initiator//DMAEMA/BMA//MAA (initiator//2/7//10)

To a solution of 5.55 g (6.31 mL, 24 mmol) of 1-(2-dimethylaminoethoxy)-1-trimethylsiloxy-2-methyl-1-propene and 0.1 mL of tetrabutylammonium biacetate (0.04M in propylene carbonate) in 30 mL of THF was added a mixture of 7.6 g (8.1 mL, 48 mmol) of 2-dimethylaminoethyl methacrylate (purified by passage over a column of basic alumina under argon), and 23.9 g (26.7 mL, 168 mmol) of n-butyl methacrylate (purified by passage over a column of basic alumina under argon) from an addition funnel. The temperature of the reaction mixture rose from 27° C. to 61° C. during the course of the addition, and an ice bath was used to moderate the temperature rise. When, following the conclusion of the addition and removal of the cooling bath, the temperature was 32° C., the dropwise addition of 49.4 g (56.1 mL, 312 mmol) of trimethylsilyl methacrylate was begun. During the course of the addition the temperature of the reaction mixture rose to 56° C. while a total of 1.2 mL of tetrabutylammonium biacetate (0.04M in propylene carbonate) was added in 4 additions, and 20 mL of THF was added to reduce viscosity. Analysis of an aliquot of the solution by $^1$H NMR showed that there was no residual monomer present. After addition of 70 mL of tetrabutylammonium fluoride trihydrate (0.03M in methanol), the solution was refluxed for 12 hr. The solution was concentrated under reduced pressure with a rotary evaporator to give 80 g of a 40.58% solids solution of poly $\omega$-2-$\beta$-dimethylaminoethyl isobutyrate(2-dimethylaminoethyl methacrylate [9 mol %]-co-n-butyl methacrylate [32 mol %]-b-methacrylic acid [59 mol %]).

The block polymer was neutralized by mixing 27.3 g of polymer solution with 6.3 g of potassium hydroxide (45% solution) and 76.4 g of deionized water until a homogeneous 10% solution was obtained.

PREPARATION C

Poly(methacrylic acid [50 mol %]-b-butyl methacrylate [50 mol %]), BMA//MAA (10//10)

A 12-liter flask was equipped with a mechanical stirrer, thermometer, nitrogen inlet, drying tube outlet, and addition funnels. Tetrahydrofuran (THF), 3750 gm, and p-xylene, 7.4 gm, was charged to the flask. Feed I [tetrabutyl ammonium m-chlorobenzoate, 3.0 ml of a 1.0M solution in acetonitrile] was started and added over 150 minutes. Feed II [trimethylsilyl methacrylate, 1976 gm; 12.5M)] was started at 0.0 minutes and added over 35 minutes. One hundred eighty minutes after Feed II is completed (over 99% of the monomers had reacted) Feed III [butyl methacrylate, 1772 gm; 12.5M] was started and added over 30 minutes. At 400 minutes, 780 gm of dry methanol is added to the above solution and the mixture was distilled. During the first stage of distillation, 1300.0 gm of material with a boiling point of below 55° C. was removed from the flask. The theoretical amount of methoxytrimethylsilane (B.P. 54° C.) to be removed is 1144.0 gm. Distillation continued during the second stage while the boiling point increases to 76° C. A total of 5100 gm of i-propanol was added during the second stage of distillation. A total of 8007 gm of solvent was removed, resulting in poly(methacrylic acid-b-butyl methacrylate); ($\overline{M}_n$=2400; 52.1% solids).

The block polymer was neutralized by mixing 500 g of polymer solution with 114.6 g of potassium hydroxide (45.6% solution) and 1,879 g of deionized water until a homogeneous 10% polymer solution was obtained.

PREPARATION D

Poly $\omega$-2-$\beta$-dimethylaminoethyl isobutyrate (butyl methacrylate [22 mol %]-co-2-phenylethyl methacrylate [22 mol %]-b-methacrylic acid [56 mol %]), amine initiator//BMA/PEMA//MAA (initiator//5/5/13)

A solution of 2.31 g (10 mmol) of 1-(2-dimethylaminoethoxy)-1-trimethyl-siloxy-2-methyl-1-propene, 0.5 mL of tetrabutylammonium biacetate hexahydrate (0.04M in THF), and 0.8 g (1.0 mL, 6 mmol) of bis(dimethylamino)-methylsilane in 100 mL of THF was allowed to stand for 10 min. Then a mixture of 7.2 g (8.0 mL, 50 mmol) of butyl methacrylate (purified by passage over a column of basic alumina under argon), 9.5 g (9.4 mL, 50 mmol) of 2-phenylethyl methacrylate (purified by passage over a column of basic alumina under argon), and 0.8 g (1.0 mL, 6 mmol) of bis(dimethylamino)-methylsilane was added dropwise from an addition funnel. The temperature of the reaction mixture rose from 25° C. to 46° C. during the course of the addition. When, following the conclusion of the addition, the temperature had fallen about 1° C., the dropwise addition of a mixture of 22.1 g (21.7 mL, 130 mmol) of 2-tetrahydropyranyl methacrylate (purified by passage over a column of basic alumina under argon) was begun. During the course of the addition, the temperature of the reaction mixture rose to 60° C. Analysis of an aliquot of the solution by $^1$H NMR showed that there was no residual monomer present. Analysis by gel permeation chromatography (GPC) showed $\overline{M}_n = 2280$, $\overline{M}_w = 3270$, $\overline{M}_w/\overline{M}_n = 1.4$. After addition of 25 mL of methanol, the solution was evaporated under reduced pressure. The residual polymer was dissolved in dichloromethane and precipitated into methanol to give 23 g of ω-2-β-dimethylaminoethyl isobutyrate-poly(butyl methacrylate [22 mol %]-co-2-phenylethyl methacrylate [22 mol %]-b-2-tetrahydropyranyl methacrylate [56 mol %]). The polymer was heated in a vacuum oven at 120° C. for 36 hr to decompose the tetrahydropyranyl ester groups, giving 16.8 g of poly ω-2-β-dimethylaminoethyl isobutyrate(butyl methacrylate [22 mol %]-co-2-phenylethyl methacrylate [22 mol %]-b-methacrylic acid [56 mol %]).

The block polymer was neutralized by mixing 16.6 g of polymer with 59.5 g of potassium hydroxide (0.984N solution) and 57.9 g of deionized water until a homogeneous 12.4% polymer solution was obtained.

PREPARATION E

Poly(methacrylic acid [56 mol %]-b-butyl methacrylate [22 mol %]-co-2-phenylethyl methacrylate [22 mol %]), BMA/PEMA//MAA (5/5//13).

A solution of 3.48 g (4.04 mL, 20 mmol) of 1-methoxy-1-trimethyl-siloxy-2-methyl-1-propene, 1 mL of tetrabutylammonium biacetate hexahydrate (0.04M in THF), and 0.8 g (1.0 mL, 6 mmol) of bis(dimethylamino)methylsilane in 250 mL of THF was allowed to stand for 10 min. Then a mixture of 44.5 g (43.6 mL, 261 mmol) of 2-tetrahydropyranyl methacrylate (purified by passage over a column of basic alumina under argon) and 0.8 g (1.0 mL, 6 mmol) of bis(dimethylamino)-methylsilane was was added dropwise from an addition funnel. The temperature of the reaction mixture rose from 25° C. to 50° C. during the course of the addition. When, following the conclusion of the addition, the temperature had fallen about 1° C., the dropwise addition of a mixture of 14.7 g (16.4 mL, 103 mmol) of butyl methacrylate (purified by passage over a column of basic alumina under argon), 19.6 g (19.4 mL, 103 mmol) of 2-phenylethyl methacrylate (purified by passage over a column of basic alumina under argon), and 0.8 g (1.0 mL, 6 mmol) of bis(dimethylamino)-methylsilane was begun. During the course of the addition the temperature of the reaction mixture rose to 56° C. Analysis of an aliquot of the solution by $^1$H NMR showed that there was no residual monomer present. After addition of 15 mL of methanol, the polymer was precipitated in methanol to give 29.2 g of poly(2-tetrahydropyranyl methacrylate [56 mol %]-b-butyl methacrylate [22 mol %]-co-2-phenylethyl methacrylate [22 mol %]). Analysis by GPC showed $\overline{M}_n = 4310$, $\overline{M}_w = 4500$, $\overline{M}_w/\overline{M}_n = 1.05$. The polymer was heated in a vacuum oven at 130° C. for 20 hr to decompose the tetrahydropyranyl ester groups, giving 20.7 g of poly(-methacrylic acid [56 mol %]-b-butyl methacrylate [22 mol %]-co-2-phenylethyl methacrylate [22 mol %]).

The block polymer was neutralized by prewetting 20 g of polymer with 20 g of a mixture of tetrahydrofuran and isopropanol (3:2 by weight) and then mixing with 71.7 g of potassium hydroxide (0.984N solution) and 21.6 g of deionized water until a homogeneous polymer solution was obtained.

PREPARATION F

Poly ω-2-β-dimethylaminoethyl isobutyrate(2-dimethylaminoethyl methacrylate [9 mol %]-co-2-phenylethyl methacrylate [35 mol %]-b-methacrylic acid [56 mol %]), amine initiator//DMAEMA/PEMA//MAA (initiator//2/8//13)

To a solution of 4.86 g (5.52 mL, 21.0 mmol) of 1-(2-dimethylamino-ethoxy)-1-trimethyl-siloxy-2-methyl-1-propene, 0.1 mL of tetrabutylammonium biacetate hexahydrate (0.04M in THF) in 30 mL of THF was added a mixture of 6.6 g (7.1 mL, 42 mmol) of 2-dimethylaminoethyl methacrylate (purified by distillation and passage over a column of basic alumina under argon), and 31.6 g (31.6 mL, 168 mmol) of 2-phenylethyl methacrylate (purified by passage over a column of basic alumina under argon) from an addition funnel. The temperature of the reaction mixture rose to 62° C. during the course of the addition, and an ice bath was used to moderate the temperature rise. When, following the conclusion of the addition, the temperature was 26° C., the dropwise addition of 43.2 g (49 mL, 273 mmol) of trimethylsilyl methacrylate was begun. During the course of the addition the temperature of the reaction mixture rose to 45° C. while a total of 1.25 mL of tetrabutylammonium biacetate hexahydrate (0.04M in THF) was added in 9 additions. Analysis of an aliquot of the solution by $^1$H NMR showed that there was no residual monomer present. After addition of 55 mL of THF, 56 mL of methanol, and 0.086 g (2.7 mmol) of tetrabutylammonium fluoride trihydrate the solution was refluxed for 9 hr. Then 50 mL of THF was added, and refluxing was continued for an additional 9 hr. The solution was evaporated under reduced pressure with a rotary evaporator. The solid residue was dried in a vacuum oven at 80° C. for 8 hr to give 57 g of poly ω-2-β-dimethylaminoethyl isobutyrate(2-dimethylaminoethyl methacrylate [9 mol %]-co-2-phenylethyl methacrylate [35 mol %]-b-methacrylic acid [56 mol %]) $^1$H NMR analysis of the polymer showed that virtually no trimethylsilyl groups remained.

The block polymer was neutralized by prewetting 30 g of polymer with 30 g of a mixture of tetrahydrofuran and isopropanol (3:2 by weight) and then mixing with 13 g of potassium hydroxide (45.6% solution) and 127 g of deionized water until a homogeneous polymer solution was obtained.

PREPARATION G

Poly(methacrylic acid [56 mol %]-β-2-phenylethyl methacrylate [44 mol %]), MAA//PEMA (13//10)

To a solution of 3.13 g (3.63 mL, 18 mmol) of 1-methoxy-1-trimethyl-siloxy-2-methyl-1-propene and 0.1 mL of tetrabutylammonium biacetate hexahydrate (0.04M in THF) in 30 mL of THF was added dropwise 37 g (42 mL, 234 mmol) of trimethylsilyl methacrylate from an addition funnel. A total of 1.9 mL of additional tetrabutylammonium biacetate solution was added in 11 portions as the temperature of the reaction mixture rose from 27° C. to 37° C. When, following the conclusion of the addition, the temperature had fallen about 1° C., the solution was cooled in an ice bath, and the dropwise addition of 34.3 g (34 mL, 181 mmol) of 2-phenylethyl methacrylate (purified by passage over a column of basic alumina under argon) was begun. During the course of the addition the temperature of the reaction mixture rose from 23° C. to 32° C. Analysis of an aliquot of the solution by $^1$H NMR showed that there was no residual monomer present. THF (100 mL) was added to reduce viscosity. After addition of 0.1 mole percent of tetrabutylammonium fluoride trihydrate in 50 mL of methanol, the solution was refluxed for 36 hr and evaporated under reduced pressure to give 53.2 g of poly(methacrylic acid [56 mol %]-b-2-phenylethyl methacrylate [44 mol %]).

The block polymer was neutralized by prewetting 21 g of polymer with 21 g of a mixture of tetrahydrofuran and isopropanol (3:2 by weight) and then mixing with 71.7 g of potassium hydroxide (0.984N solution) and 21.6 g of deionized water until a homogeneous 15% polymer solution was obtained.

PREPARATION H

Poly(n-butyl methacrylate [35 mol %]-co-2-dimethylaminoethyl methacrylate [15 mol %]-b-methacrylic acid [50 mol %], BMA/DMAEMA//MAA (7/3//10)

A 3-liter flask is equipped with a mechanical stirrer, thermometer, nitrogen inlet, drying tube outlet, and addition funnels. Tetrahydrofuran THF, 812 gm, and p-xylene, 4.9 gm, was charged to the flask. Feed I [tetrabutyl ammonium m-chlorobenzoate, 1.2 ml of a 1.0M solution in acetonitrile] was started and added over 240 minutes. Feed II [trimethylsilyl methacrylate, 434 gm (2.75M)] was started at 0.0 minutes and added over 30 minutes. Ninety minutes after Feed II was completed, Feed III [butyl methacrylate, 272 gm (1.91M) and 2-dimethylaminoethyl methacrylate, 130 gm (0.828)] was started and added over 30 minutes. At 400 minutes, when all monomers were converted, 344 gm of dry methanol was added to the above solution and the mixture was distilled. During the first stage of distillation, 317.0 gm of material was removed from the flask. A total of 162 gm of i-propanol was added to yield poly(n-butyl methacrylate [35 mol %]-co-2-dimethylaminoethyl methacrylate [15 mol %]-b-methacrylic acid [50 mol %] ($\overline{M}_n$=2700; 35.08% solids).

The block polymer was then neutralized (at 90 molar %) by adding 45% potassium hydroxide solution to the block polymer solution, diluting with deionized water, and mixing until a 15% homogeneous solution was obtained.

SAMPLE PREPARATION

Control 1

A black pigment concentrate was prepared using the following procedure:

| Ingredient | Amount (Part by Weight) |
| --- | --- |
| FW18, Carbon black pigment (Degussa Corp., Allendale, NJ) (pH = 4) | 16.0 |
| Polymer obtained in Preparation C | 80.0 |
| Deionized water | 64.0 |

The above mentioned components were premixed in a plastic beaker by stirring until no lumps or dry clumps of pigment were visible. The mixture was added to a mini motor mill 250 (manufactured by Eiger Machinery Inc., Bensenville, Ill. 60106). Milling was carried out at 4500 rpm with 0.8 mm glass beads for 30 minutes to give a 10% pigment concentrate, having a final particle size of 133 nm as determined by Brookhaven BI-90 particle sizer (Brookhaven Instruments Corp., Holtsville, N.Y.). The final pH was 8.15.

EXAMPLE 1

A black pigment concentrate was prepared using the following procedure:

| Ingredient | Amount (Part by Weight) |
| --- | --- |
| FW18, Carbon black pigment | 16.0 |
| Polymer obtained from Preparation A | 47.2 |
| Deionized water | 96.8 |

The above ingredients were premixed and milled as described in Control 1 to give a 10% pigment concentrate, having a final particle size of 129 nm as determined by a Brookhaven BI-90 particle sizer. The final pH was 8.3.

EXAMPLE 2

A black pigment concentrate was prepared using the following procedure:

| Ingredient | Amount (Part by Weight) |
| --- | --- |
| FW200, Carbon black pigment (Degussa Corp., Allendale, NJ) (pH = 2.5) | 22 |
| Polymer obtained in Preparation B | 110 |
| Deionized water | 88 |

The above mentioned components were premixed and milled as described in Control 1 to give a 10% pigment concentrate. 1.0 gram of 45.6% KOH solution was added to adjust the pH to 7.52. The final particle size was 125 nm as determined by Brookhaven BI-90 particle sizer.

Control 2

A black pigment concentrate was prepared using the following procedure.

| Ingredient | Amount (Part by Weight) |
| --- | --- |
| FW200, carbon black pigment | 30.0 |
| Polymer obtained in Preparation E | 100.0 |
| Deionized water | 70.0 |

The above mentioned components were premixed and milled as described in Control 1 to give a 15% pigment concentrate. KOH solution (0.984N, Aldrich Chemical Co., Milwaukee, Wis.) was added to adjust the pH to 7.60 and the concentrate was diluted with deionized water to 10% pigment concentration. The final particle size was 127 nm as determined by Brookhaven BI-90 particle sizer.

EXAMPLE 3

A black pigment concentrate was prepared using the following procedure:

| Ingredient | Amount (Part by Weight) |
| --- | --- |
| FW200, carbon black pigment | 33.2 |
| Polymer obtained in Preparation D | 134.0 |

-continued

| Ingredient | Amount (Part by Weight) |
|---|---|
| KOH Solution, 0.984 N (Aldrich Chemical Co., Milwaukee, WI) | 30.0 |
| Deionized water | 134.8 |

The above mentioned components were premixed and milled as described in Control 1 to give a 10% pigment concentrate, having a final particle size of 128 nm as determined by Brookhaven BI-90 particle sizer. The final pH was 7.60.

Control 3

A black pigment concentrate was prepared using the following procedure:

| Ingredient | Amount (Part by Weight) |
|---|---|
| FW200, carbon black pigment | 15.0 |
| Polymer obtained in Preparation G | 50.0 |
| Deionized water | 85.0 |

The above mentioned components were premixed by stirring for 10–15 minutes until no lumps or dry clumps of pigment were visible. This mixture was then charged to a minimill 100 (Eiger Machinery Inc., Bensenville, Ill.). Milling was carried out at 3500 RPM for an hour. The dispersion was filtered through a 3M 114A Liquid Filter Bag (3M, St. Paul, Minn.) under vacuum to give a 10% pigment concentrate, having a final particle size of 98 nm as determined by Brookhaven BI-90 particle sizer. The final pH was 7.72.

EXAMPLE 4

A black pigment concentrate was prepared using the following procedure:

| Ingredient | Amount (Part by Weight) |
|---|---|
| FW200, carbon black pigment | 15.0 |
| Polymer obtained in Preparation F | 50.0 |
| Deionized water | 85.0 |

The above mentioned components were premixed by mechanical stirring. A few drops of a 45% KOH solution (J. T. Baker Inc., Phillipsburg, N.J.) were added to adjust the pH to 7.3. The mixture was passed through a microfluidizer (Microfluidics Corp., Newton, Mass.) under a liquid pressure of 9,000–11,000 psi 5 times to give a 10% pigment concentrate, having a final particle size of 104 nm as determined by the Brookhaven BI-90 particle sizer.

Stability Test

Dispersion stability of the above inks was determined by measuring the particle size change in delta nm on a Brookhaven BI-90 particle sizer after the ink samples had been subjected to 4 temperature cycles, each consisting of 4 hours at $-20°$ C. and 4 hours at $70°$ C. The results are shown in Table 1 below.

TABLE 1

| Cosolvent or Surfactant | Delta nm | | | | | | |
|---|---|---|---|---|---|---|---|
| | C1 | E1 | E2 | C2 | E3 | C3 | E4 |
| Cosolvents[1]: | | | | | | | |
| Neopentyl glycol (2,2-Dimethyl-1,2-propanediol) | 68 | 9 | 0 | 0 | 0 | 0 | 0 |
| 3,3-Dimethyl-1,2-butanediol | 58 | 7 | 6 | 15 | 0 | 2 | 1 |
| 1,2,4-Butanetriol | 2 | 0 | 0 | 42 | 0 | 21 | 9 |
| Dowanol ® TBH | F | F[3] | 20 | F | 4 | 7 | 2 |
| Butyl carbitol | F | F | 10 | F | 5 | 11 | 9 |
| Liponic ® EG-1 | 74 | 10 | 1 | F | 10 | 15 | 9 |
| N-Acetyl ethanolamine | 44 | 3 | 2 | F | 25 | 47 | 19 |
| 1-Ethyl-2-pyrrolidinone | 49 | 6 | 0 | F | 8 | 0 | 5 |
| 1,4-Cyclohexanedimethanol | 44 | 0 | 0 | 26 | 0 | 0 | 0 |
| Surfactants[2]: | | | | | | | |
| Merpol ® SH | F | 76 | 5 | 56 | 0 | 0 | 0 |
| Aerosol ® MA-80/ Aerosol ® OT (2/1) | 74 | 17 | 3 | 14 | 0 | 0 | 0 |
| Surfynol ® CT-136 | 98 | 24 | 0 | 0 | 0 | 0 | 0 |
| Surfynol ® 465 | F | 29 | 0 | 37 | 0 | 6 | 0 |
| Triton ® X-100 | F | 21 | 3 | 3 | 0 | 9 | 0 |
| Synthrapol ® KB | F | 36 | 0 | 78 | 0 | 42 | 0 |

Based on the data, the stability was markedly improved for polymer having an amine function on the A block over the non-amine containing polymers. In the first set of examples (E1, E2 vs. C1), the data indicated that with one amine group at the open end of the A block as in E1 gave a marked stability improvement over the non-amine containing control C1. However, by incorporating additional amine groups in the block as in E2, the stability was further improved. E3 had one amine group at the open end of the A block. E4 had amine groups at the open end of the A block and in the A block. Both examples showed stability improvement over their respective non-amine containing controls.

Notes

Neopentyl glycol, 3,3-dimethyl-1,2-butanediol, 1,2,4-butanetriol, butyl carbitol, N-acetyl ethanolamine, 1-ethyl-2-pyrrolidinone, 1,4-cyclohexanedimethanol were obtained from Aldrich Chemical Co., Milwaukee, Wis. Dowanol ® TBH was obtained from Dow Chemical, Midland, Mich. Liponic ® EG-1 was obtained from Lipo Chemicals Inc., Paterson, N.J. Merpol ® SH was obtained from E. I. du Pont de Nemours and Company, Wilmington, Del. Aerosol ® MA-80 and OT were obtained from American Cyanamid Co., Wayne, N.J. Surfynol ® CT-136 and 465 were obtained from Air Products and Chemicals, Inc., Allentown, Pa. Triton ® X-100 was obtained from Rohm & Haas Co., Philadelphia, Pa. Synthrapol ® KB was obtained from ICI Americas, Inc., Wilmington, Del.

1. Cosolvents were tested at 8% (by weight) of the total liquid carrier medium.
2. Surfactants were tested at 3% (by weight) of the total liquid carrier medium.
3. F = Grossly flocculated Print Test Test #1: A black ink was formulated with the following composition:

| Ingredient | Amount (Part by Weight) |
|---|---|
| Pigment concentrate of Example 3 | 10.0 |
| 3,3-Dimethyl-1,2-butanediol | 1.9 |

-continued

| Ingredient | Amount (Part by Weight) |
| --- | --- |
| Deionized water | 8.1 |

The ink was filled into a thermal ink jet pen and printed with a Hewlett Packard DeskJet ink jet printer on Gilbert bond paper (25% cotton, Mead Co., Dayton, Ohio). It printed smoothly and the print was dry to touch in less than 5 seconds with ink penetrating through the paper very rapidly. The print density was 1.02.

Test #2: A black ink was formulated with the following composition:

| Ingredient | Amount (Part by Weight) |
| --- | --- |
| Pigment concentrate of Example 1 | 7.0 |
| 3,3-Dimethyl-1,2-butanediol | 0.95 |
| Liponic EG-1 | 0.95 |
| Deionized water | 11.1 |

The ink was filled into a thermal ink jet pen and printed with a Hewlett Packard DeskJet ink jet printer on Gilbert bond paper (25% cotton, Mead Co., Dayton, Ohio). It printed smoothly and the print was dry to touch in 25 seconds with ink penetrating through the paper rapidly. The print density was 0.93.

Test #3: A black ink was formulated with the following composition:

| Ingredient | Amount (Part by Weight) |
| --- | --- |
| Pigment concentrate of Example 4 | 7.0 |
| LDiethylene glycol | 0.95 |
| Butyl carbitol | 1.52 |
| Surfynol 465 | 0.19 |
| Deionized water | 10.34 |

The ink was filled into a thermal ink jet pen and printed with a Hewlett Packard DeskJet ink jet printer on Gilbert bond paper (25% cotton, Mead Co., Dayton, Ohio). It printed smoothly and the print was dry to touch in less than 5 seconds with ink penetrating through the paper very rapidly. The print density was 0.94.

EXAMPLE 5

The following ingredients were added in turn slowly in a beaker and mixed.

| Ingredient | Amount (Grams) |
| --- | --- |
| Polymer obtained in Preparation H | 133.3 |
| FW-200 carbon black pigment | 40.0 |
| Deionized water | 26.7 |

Stirring was continued for 10-15 minutes until no lumps or dry clumps of pigment were visible. This mixture was then charged to a minimill 100 (Eiger Machinery Inc., Bensenville, Ill.). Milling was carried out at 3500 RPM for an hour. The dispersion was filtered through a 3M 114A Liquid Filter Bag (3M, St. Paul, Minn.) under vacuum to yield a pigment dispersion that had 10% pigment and a 2/1 pigment/Block polymer ratio.

EXAMPLE 6

The following ingredients were added in turn slowly in a beaker and mixed:

| Ingredient | Amount (Grams) |
| --- | --- |
| Polymer obtained in Preparation C | 133.3 |
| FW-200 carbon black pigment | 40.0 |
| Deionized water | 26.7 |

Stirring was continued for 10-15 minutes until no lumps or dry clumps of pigment were visible. This mixture was then charged to a minimill 100 (Eiger Machinery Inc., Bensenville, Ill.). Milling was carried out at 3500 RPM for an hour. The dispersion was filtered through a 3M 114A Liquid Filter Bag (3M, St. Paul, Minn. 55144) under vacuum. This made a pigment dispersion that had 10% pigment and a 2/1 Pigment/Block polymer ratio.

Testing

The following shows the difference in dispersion stability between dispersions based on acidic pigments and amine containing block polymers and dispersions based on acidic pigments and non-amine containing block polymers. The dispersions were added to the listed solvents below to give a 1% pigment concentration. The following is a description of the dispersion characteristics:

Dispersed Pigment particles are uniformly separated and in which Brownian motion of particles is evident.

Slightly Flocculated Pigment particles are separated but immobile (no significant evidence of Brownian motion).

Flocculated Pigment particles are highly aggregated with large voids between aggregates.

| DISPERSION CHARACTERIZATION | | |
| --- | --- | --- |
| SOLVENT | EXAMPLE 5 | EXAMPLE 6 |
| Water | Dispersed | Dispersed |
| DEG | Dispersed | Flocculated |
| Water/TBH | Dispersed | Flocculated |
| Water/butyl/carb | Dispersed | Flocculated |
| Water/butyl cell | Slight flocculation | Flocculated |

DEG = Diethylene glycol
Water/TBH = 80/20 water/triethylene glycol monobutyl ether
Water/butyl/carb = 80/20 water/butyl carbitol
Water/butyl cell. = 80/20 water/butyl cellosolve The above shows that dispersions made with acidic pigments and amine containing polymers are more stable than those made with acidic pigments and polymeric dispersants that do not contain amines.

EXAMPLE 7

A black ink was prepared using the following procedure:

| Ingredient | Amount (Grams) |
| --- | --- |
| Dispersion from Example 5 | 50.0 |
| Neopentyl glycol | 15.0 |
| Triton ® X100 (Rohm & Haas, Philadelphia, PA) | 3.0 |
| Deionized water | 32.0 |

The above mentioned components were mixed for 2 hours. The finished ink was filtered through 2 micron filters and had a viscosity of 5.7 cps, a surface tension of 34.0 dynes/cm, a pH of 7.2 and a particle size of 87 nm (86 nm after thermal cycling test). The ink has excellent thermal stability and prints cleanly and with uniform density on a Hewlett Packard DeskJet printer (Hewlett Packard, Palo Alto, Calif.).

What is claimed is:

1. An aqueous ink jet ink composition comprising:
   (a) an aqueous carrier medium;
   (b) a pigment having a pH below 7.0; and
   (c) an AB block polymer consisting of
      (1) an A block comprising a hydrophobic polymer having at least one basic amine functional group; and
      (2) a B block comprising a hydrophilic polymer selected from the group consisting of non-ionic polymers, and polymers containing acidic functional groups.

2. The ink of claim 1, wherein the A block is prepared by polymerizing monomers with amine functions.

3. The ink of claim 2, wherein the A block is prepared by polymerizing monomers selected from the group consisting of dimethylaminoethyl methacrylate, diethylaminoethyl methacrylate, t-butylaminoethyl methacrylate, dimethylaminoethyl acrylate and diethylaminoethyl acrylate.

4. The ink of claim 1, wherein the A block is prepared using amine-containing initiators.

5. The ink of claim 1, wherein said at least one amine group is at the open end of the A block.

6. The ink of claim 1, wherein said at least one amine group is within the A block.

7. The ink of claim 1, wherein said A block contains a plurality of amine groups and wherein one of said amine groups is at the open end of the A block.

8. The ink of claim 1, wherein the B block is prepared from monomers selected from the group consisting of methacrylic acid, acrylic acid, hydroxyethyl methacrylate, ethoxytriethylene glycol methacrylate.

9. The ink of claim 1, wherein the B block is 10 to 90% by weight based on the total weight of the entire block polymer.

10. The ink of claim 9, wherein the B block is neutralized with a neutralizing agent selected from the group consisting of organic bases, alkanolamines, alkali metal hydroxides, and mixtures thereof.

11. The ink of claim 10, wherein the neutralizing agent is an alkali metal hydroxide.

12. The ink of claim 7, wherein said ink contains approximately 0.1 to 15% pigment, 0.1 to 30% block copolymer, and 70 to 99.8% aqueous carrier medium, based on the total weight of the ink.

13. The ink of claim 1, wherein the aqueous carrier medium comprises water or a mixture of water and at least one organic solvent.

14. The ink of claim 13, wherein the organic solvent is a polyhydric alcohol.

15. The ink of claim 1, wherein the pigment particles have a size of approximately 0.005 to 15 microns.

16. The ink of claim 1, wherein said ink has a surface tension in the range of approximately 20 to 70 dyne/cm and a viscosity in the range of approximately 1.0 to 10.0 cP at 20° C.

17. The ink of claim 1, further comprising a surfactant.

18. An aqueous ink jet ink composition comprising
   a) an aqueous carrier medium selected from the group consisting of water and a mixture of water and at least one water soluble organic solvent, said aqueous carrier medium being present in the range of from about 70% to about 99.89% by weight based on the total weight of the ink composition;
   b) a pigment having a pH value below 7.0;
   c) an AB block polymer consisting of
      (1) an A block comprising a hydrophobic polymer having at least one basic amine functional group; and
      (2) a B block comprising a hydrophilic polymer selected from the group consisting of non-ionic polymers, and polymers containing acidic functional groups, said AB block polymer being present in the range of from about 0.1% to about 30% by weight based on the total weight of the ink composition; and
   d) a surfactant;
said ink jet ink having a viscosity in the range of about 1.0 to about 10.0 cP at 20° C. and a surface tension in the range of about 30 to about 70 dyne/cm.

* * * * *